United States Patent
Haslund

[11] Patent Number: 6,105,489
[45] Date of Patent: Aug. 22, 2000

[54] APPARATUS FOR CONTINUOUS TEMPERING OF CHOCOLATE-LIKE MASS

[75] Inventor: Henning Haslund, Bjæverskov, Denmark

[73] Assignee: Aasted-Mikroverk ApS, Farum, Denmark

[21] Appl. No.: 09/267,641

[22] Filed: Mar. 15, 1999

[30] Foreign Application Priority Data

Mar. 16, 1998 [EP] European Pat. Off. .............. 98200823

[51] Int. Cl.⁷ .............................. A23G 1/00; A23C 3/04; B01F 7/16; B01F 15/06
[52] U.S. Cl. .................................. 99/455; 99/348; 99/452; 99/453; 99/470; 99/483; 99/485; 366/144; 366/149
[58] Field of Search ............................... 99/452–455, 483, 99/485, 467–470, 348; 426/231, 524, 519, 660; 366/144–149, 293, 304

[56] References Cited

U.S. PATENT DOCUMENTS

| | | | |
|---|---|---|---|
| 4,859,483 | 8/1989 | Sollich | 426/519 |
| 4,892,033 | 1/1990 | Sollich | 99/455 |
| 5,188,853 | 2/1993 | Sollich | 426/231 |
| 5,514,390 | 5/1996 | Aasted | 426/231 |
| 5,850,782 | 12/1998 | Aasted | 99/455 |
| 5,862,745 | 1/1999 | Aasted | 99/470 |
| 5,899,562 | 8/1989 | Aasted | 366/149 |

FOREIGN PATENT DOCUMENTS

| | | |
|---|---|---|
| 0 289 849 A2 | 11/1988 | European Pat. Off. . |
| 0 472 886 A1 | 3/1992 | European Pat. Off. . |
| 0 654 222 A1 | 5/1995 | European Pat. Off. . |
| 0 685 168 A1 | 12/1995 | European Pat. Off. . |
| 0 806 149 A2 | 11/1997 | European Pat. Off. . |
| 40 04 491 A1 | 9/1990 | Germany . |

*Primary Examiner*—Timothy Simone
*Attorney, Agent, or Firm*—Finnegan, Henderson, Farabow, Garrett & Dunner, L.L.P.

[57] ABSTRACT

The invention concerns an apparatus for continuously tempering a fat containing chocolate mass, whereby the mass is subjected to a primary cooling, a subsequent secondary cooling creating crystals in the mass, and a final reheating.

12 Claims, 4 Drawing Sheets

APPARATUS FOR CONTINUOUS TEMPERING OF CHOCOLATE-LIKE MASS

BACKGROUND OF THE INVENTION

The invention concerns a method of continuously tempering a fat-containing, chocolate-like mass, whereby the mass is subjected to a primary cooling, a subsequent secondary cooling creating crystals in the mass, and a final reheating.

The invention further concerns an apparatus for continuous tempering of a fat-containing, chocolate-like mass, comprising a primary cooling section, a subsequent secondary cooling section in which crystals are created in the mass, and a final reheating section.

For many years, the method has been used extensively for production of a great variety of chocolate-like masses. Before tempering, the chocolate-like mass is warmed up to around 40–60° C. After tempering, the mass typically has a temperature of around 29–33° C., whereafter it is being used for many purposes, such as being filled in moulds, deposited on top of other articles, etc.

The aim of the tempering process is briefly spoken, to create a mass with a portion and a type of crystals, that satisfies, that the chocolate-like mass for sure will solidify to a state, which results in a "high" quality article. To the skilled person, a "high quality" article brings along a glossy surface, long time storage capacity without diffusion of fat content to the surface, crispy break, and of course good taste as well. Experience has gained the knowledge to the skilled person, that such high quality is heavily dependent upon the type of crystals created in the mass during tempering, as well as the actual portion of such crystals, either in relation to the weight of the total mass, or in relation to the fat content of the mass.

Extensive scientific research has since long provided the teaching, that of the several available crystal forms, which may be performed during tempering of a chocolate-like mass, it is the stable β-crystals only, which for sure provides high quality chocolate-like mass.

Prior Art

In view of this, methods and apparatuses by which the primary cooling is performed in a first section, and crystals are performed in a secondary cooling section has been available for many years. The theory is, that the mass is to be cooled down in the first section to a temperature "close" to the temperature, at which stable crystals perform in the mass. It is well known, that for each type of chocolate-like mass, whatever its composition may be, such temperature may be determined by simple tests. For most types of chocolate-like mass, such temperatures are between 26° C. and 30° C. Thereafter, the mass is caused to pass through the secondary cooling section, in which the crystals are created. By observing, that the temperature of the cooling medium is sufficiently low in that section, the heat caused by the crystal formation is removed entirely. The mass temperature could be constant or lowered slightly further in the secondary section. Thereby, the skilled person was at least sure, that crystals were performed in that secondary section.

Such apparatuses are among the latest teachings known from EP 0 472 886 A1 and EP 0 685 168 A1. By these known apparatuses the cooling sections and the reheating section is arranged on top of each other in a column, each of which cooling sections comprise at least one mass chamber through which the mass flows, as well as at least one medium chamber through which the cooling medium flows. The mass is subjected to stirring means arranged in the mass chambers.

By these teachings various types of cooling medium circuits are suggested for the secondary section. Common to each suggestion is that the circuit is laid out to achieve an independent control of the cooling for the secondary cooling stage only. Thereby the formation of stable crystals in the secondary section only, may be controlled quite accurately.

However, practice as well as scientific testing has shown, that the temperature of the cooling water flowing through the primary cooling section differs so much as 10° C. for the apparatus type disclosed in EP 0 472 886 A1 when the temperature or flow of the mass through the apparatus changes. The unavoidable effect measured was, that the temperatures of the cooling surfaces in that primary cooling section fluctuated extensively as well. It was surprisingly realised that this was the cause to a varying amount of crystals in the ready tempered mass.

By further testing it was obtained, that by this apparatus type it was impossible to perform a control, so that creation of crystals were limited to the secondary cooling section only, as it supposedly was the intention. Though minor temperature fluctuations were experienced by the apparatus type of EP 0 685 168 A1 it was not possible with this apparatus type either to obtain a desired, essentially constant portion of crystals in the tempered mass when mass temperature or flow changes. By constant portion of crystals is meant, that the amount of crystals constitutes a constant percentage of the total amount of the tempered mass.

The conclusion was that by none of the above-referred teachings a constant portion of crystals could be obtained in the tempered mass. This is due to the fact, that the cooling of the primary cooling section of these known apparatuses is controlled in response to the temperature of the mass only. Thereby it is unavoidable, that the temperature of the cooling surfaces of the mass chambers in the primary cooling section changes when the temperature or the flow of the mass changes. When the temperature of the surfaces fluctuates downwards the unintended effect is, that the crystal formation area of the secondary cooling section is extended by areas of the primary cooling section, in which the cooling water temperature from time to time is sufficiently low for crystals to be performed in the mass. The end result is a varying as well as a higher portion of crystals in the mass from time to time than intended, which is not desirable.

The skilled person always tries to reach a tempered mass with a portion of stable crystals, which is kept as constant as possible during the total production. When the exact, and therefore desired amount of crystals for the specific chocolate type has been established empirically, the aim is to reach that desired amount as closely as possible for every article produced. Only then, the manufacturer is sure, that the good qualities such as a glossy surface, long time storage capacity without diffusion of fat content to the surface, crispy break, and of course good taste is preserved for every article produced.

As it is the actual control performed for the cooling sections during tempering of the mass that determines the achieved portion of crystals in every article produced, it is of outmost importance to establish such control as exact and reliable as possible with a view of obtaining a constant a portion of crystals in the mass.

Furthermore, the EP 0 472 886 A1 teaches, that a "high" portion of stable crystals in the tempered mass is desirable. The teaching EP 0 289 849 A1 further states, that 4–5% stable crystals of the mass should be reached during tempering. The desire for such a "high" content of stable crystals actually verifies a long time impression within the field of tempering.

However, for the latest few years the desire for a "high" content of stable crystals has suddenly been left. The persons skilled within the field have recognised, that scientific research today guides in the opposite direction, and that is for a very "low" portion of stable crystals in the mass. Such "low" portion is preferably around 0.2–2.0% of the fat content of the mass. It is evident, that when aiming at such "low" portions of crystals to be kept constant, it is even more important to minimise the variations in crystal amount in relation to the desired "low" portion, as every actual variation gives a much greater percentage deviation from the desired portion than compared to, when a "high" portion of crystals is aimed at.

Therefore, the general change within the field towards such comparably "low" portions of stable crystals makes it even more important to achieve an exact control of the cooling. Only with an exact and reliable control of the cooling, an essentially constant portion of crystals in the mass may be achieved, especially whatever the variations in the mass temperature or flow may be.

SUMMARY OF THE INVENTION

According to the inventive method, the temperature of cooling medium performing the primary cooling is controlled to be higher than the temperature of cooling medium performing the secondary cooling for any raise or drop in the secondary cooling medium temperature.

The inventive apparatus further comprises means, which are adapted to control, that the temperature of cooling medium flowing through the primary cooling section is higher than the temperature of cooling medium flowing through the secondary cooling section for any raise or drop in the secondary cooling medium temperature.

Hereby is surprisingly obtained, that the achieved portion of crystals in the mass may be kept substantially constant.

By the invention, the creation of crystals in the mass is substantially avoided during the primary cooling. Uncontrolled creation of crystals by the primary cooling is excluded, and therefore has no influence on the actual portion of crystals in the tempered mass.

Thereby, the creation of crystals in the mass is limited to the secondary cooling only, by which it may be readily controlled to a constant portion. How constant it may be kept rest upon the exactness of the control of the secondary cooling only. Tests has proven, that deviations within 1/10 only of the desired constant portion of crystals, may then be obtained with the known means for regulating the secondary cooling. By the invention, an "overtempered" mass with a too high and varying portion of crystals could be avoided as well, and production of "high quality" articles from the tempered mass is always obtained.

During the initial adjustment of the tempering process according to the invention, the temperature of the cooling medium performing the secondary cooling, is adjusted to a level where it provides a temperature of the cooling surfaces that satisfies creation of crystals in the mass. This could advantageously be obtained by lowering the cooling medium temperature just sufficiently for the crystals to perform at the secondary section. By the inventive control, where the temperature of the cooling medium performing the primary cooling is always higher than the temperature of the cooling medium flowing through the secondary cooling section, the creation of crystals in the primary section is avoided.

Important to notice is, that it was surprisingly found by the inventor, that when approaching the cooling medium temperature by which crystals performs in the mass in question, it was sufficient to lower the temperature only very slightly further down for the desired stable crystals to perform in the mass. The sufficient slight further lowering of the cooling medium temperature in the secondary section could be so low as fractions or tenths of one degree Celsius for the crystals to perform, especially was a further lowering of 0.5–1.0° C. sufficient for all types of masses tested.

This control could be performed by continuously comparing the inlet temperature of the primary cooling media with the inlet temperature of the secondary media under every regulation performed to the secondary cooling media temperature. This applies under initial adjustment of the tempering process as well as under continues production. Other options is comparison between average temperatures of the secondary cooling medium with that of the primary cooling medium, or comparison between any temperature of the primary cooling medium with the outlet temperature of the secondary cooling medium, respectively.

The temperature of the cooling medium entering, and, or leaving the secondary cooling is preferably measured continuously.

Advantageously, by controlling the temperature of cooling medium supplied to perform the primary cooling to be equal to, or higher than the temperature of the cooling medium leaving the secondary cooling at any time during tempering, creation of crystals are totally avoided in the primary section.

The temperature of the cooling medium in the secondary section is advantageously targeted to between 5° C. and 22° C., preferably to between 14° C. and 18° C. depending upon the type of the chocolate-like mass in question. It was surprisingly found, that for most types of masses, it was sufficient to target the temperature of the cooling medium in the secondary section to around 18° C. for the crystals to perform in the mass.

It was further surprisingly found, that a compulsory control of the primary cooling could be effected by connecting an outlet of the secondary cooling section to an inlet of the primary cooling section via a cooling medium conduit, so that the cooling medium, which has performed the secondary cooling is lead on to perform the primary cooling as well. Thereby, an independent control of the primary cooling is excluded, and the control of that primary cooling follows entirely by the control effected for the secondary cooling by the cooling medium in question. Furthermore, misoperation of the primary cooling section or misadjustment of the primary cooling procedure caused by the personnel is totally avoided. Only the secondary cooling section has to be adjusted.

The temperature of the cooling medium supplied to perform the primary cooling could be until 15° C. higher, and preferably 0.5° C.–5.0° C. higher than the outlet temperature of the cooling medium, which has performed the secondary cooling.

This could advantageously be effected by an outlet of the primary cooling section being connected to the inlet of the primary cooling section so that cooling medium is re-circulated through the primary cooling section. Thereby is furthermore obtained a more efficient heat exchange in the primary section, as the difference between the inlet and outlet temperatures of the cooling medium is smaller than without a re-circulation.

Further, the apparatus could comprise a further subsequent, third cooling section through which the cooling medium conduit leads the cooling medium before it enters the inlet of the primary cooling section. Thereby a more stable heat exchanger is provided by which the cooling medium temperatures are surprisingly more stable than without that third section. This applies especially when a mass temperature sensor is arranged in that third section and constitutes part of control means for the regulation of the secondary cooling.

A superior control of the secondary and the primary cooling is achieved, when a mass temperature sensor is arranged in the mass, and is connected to control means adapted to control the flow of the cooling medium performing the secondary cooling in response to the temperature of the mass.

The control means could comprise an electronic control unit connected to the temperature sensor as well as to valve or pump means regulating the flow of the cooling medium supply to the secondary cooling section. Thereby, the obtained cooling in the secondary section corresponds exactly to the desired cooling amount for the crystals to perform in the required portion of the total amount of mass, whatever the flow or the temperature of the mass may be.

Advantageously, the apparatus could further comprise a cooling medium temperature sensor, which is arranged in the cooling medium before it enters the secondary cooling section, and which is connected to other control means, such as an electronic control unit and pump or valve means, that controls the temperature of the cooling medium to a constant level. The pump means will essentially obtain a continuous flow of cooling medium through the secondary cooling section.

BRIEF DESCRIPTION OF THE DRAWINGS

The invention will be explained more fully below with reference to preferred embodiments and the drawings, in which.

DETAILED DESCRIPTION OF THE INVENTION

Figure 1:
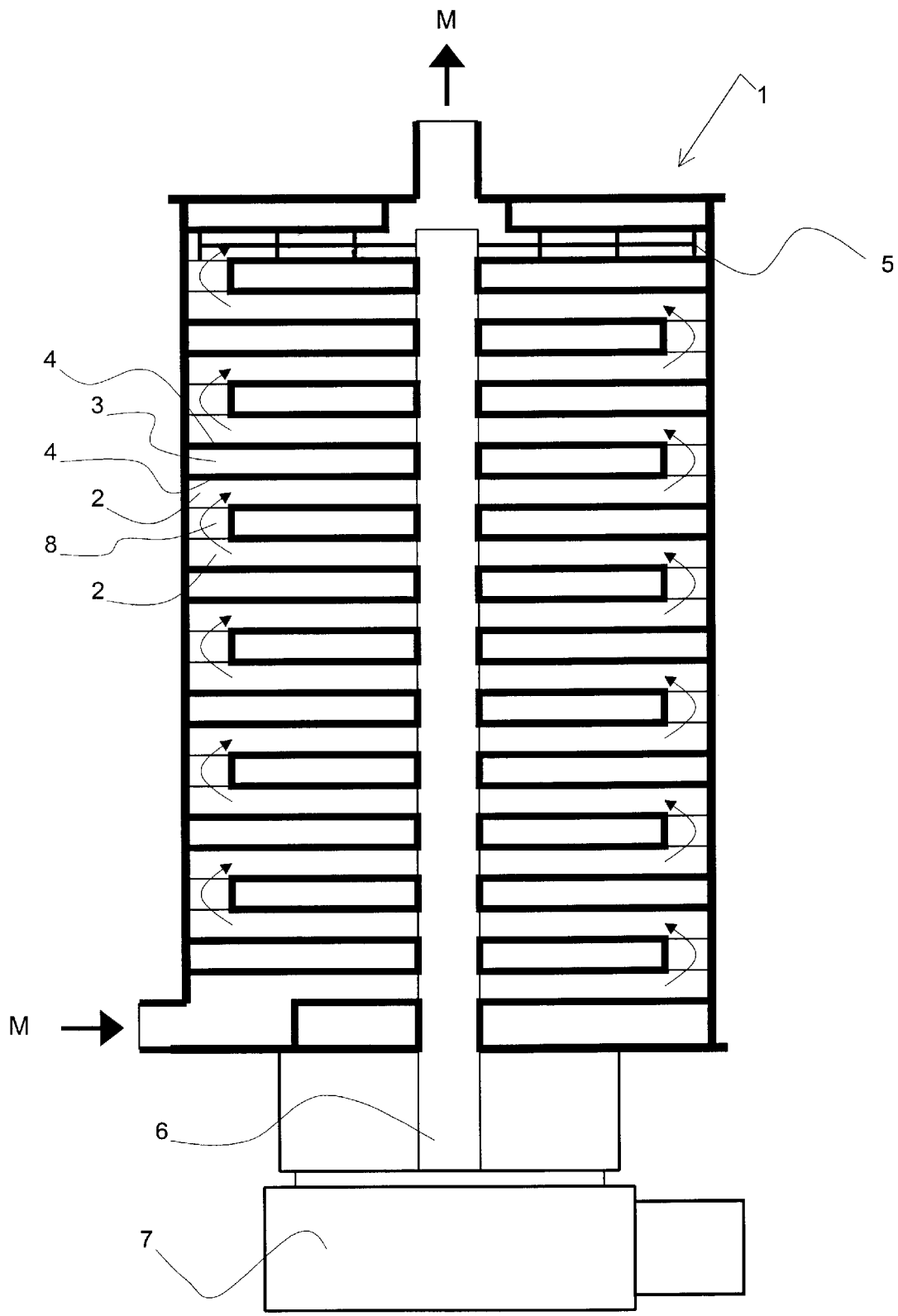
FIG. 1 shows schematically a vertical section of the tempering column of a tempering apparatus.

The tempering column 1 shown in FIG. 1 has a circular vertical section, and comprises a plurality of alternating mass chambers 2 and intermediary medium chambers 3 for cooling or heating medium, which chambers 2, 3 are separated by intermediary, disk-shaped walls 4. In each mass chamber 2 are preferably arranged a stirring means 5, whereof only one is shown for clarity, and which stirring means 5 are rotated by means of a central, vertical shaft 6 driven by a motor 7.

By means of for instance a pump, which is not shown, the mass is forced to flow through the tempering column 1 with a general vertical direction M, which by the disclosed embodiment is from the bottom to the top. In each mass chamber 2, the mass is subjected to a stirring means 5, as well as to cooling or a heating effected to the mass by the cooling or heating medium in question flowing through the adjacent chamber 3. The mass chambers are interconnected by openings 8, which preferable are arranged at the periphery of the column 1 or at the centre close to the vertical shaft 6.

Such a tempering column has been known for more than half a century, and is today the most widely used heat exchange means for tempering of chocolate-like mass. It is furthermore well-known, that the best performance of such a tempering column is achieved, when the cooling or heating medium flow continuously through the chambers and when the stirring means 5 exerts shearing forces as well as a force-full stirring to the mass.

Though the inventive method and apparatus is explained in relation to the above mentioned type of tempering column only, the invention may apply for every other type of tempering system. Other systems may comprise a tempering column, which is horizontal or inclined or even partitioned in several sections, or the column may be substituted by vessels or tubes.

Figure 2:
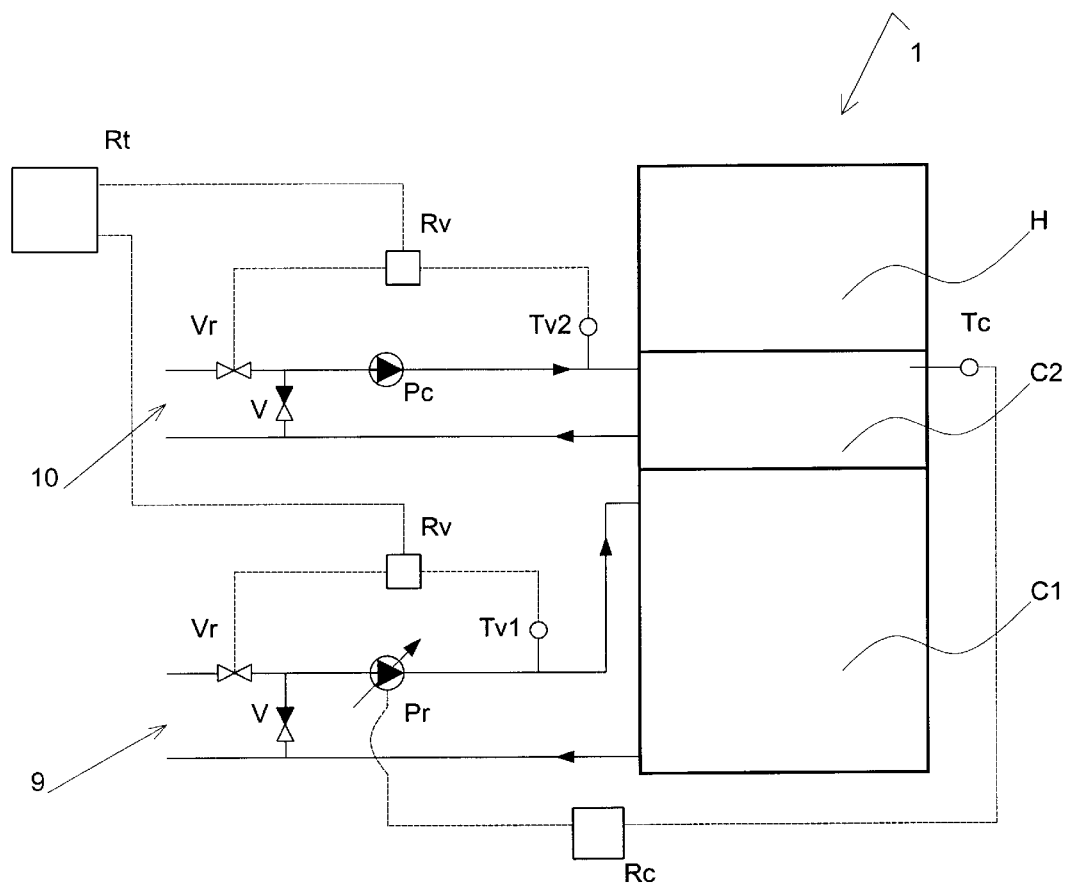
FIG. 2 shows schematically the tempering column and the associated circuit of a first embodiment of a tempering apparatus.

The first embodiment of the inventive apparatus shown in FIG. 2 comprises a vertical tempering column 1 of the type shown in FIG. 1. For clarity, the tempering column 1 is disclosed schematically in FIG. 2 without details, as only the actual extension of the cooling and heating sections are disclosed. Such extensions are simply established by having the cooling or heating medium for the section in question flowing through a predetermined and interconnected number of chambers. The extension of the section in question will thereby correspond to the number of chambers through which the medium flow with the specific temperature chosen for that section.

The apparatus for continuous tempering of a fat-containing, chocolate-like mass shown in FIG. 2 comprises a primary cooling section C1, a subsequent secondary cooling section C2, in which stable crystals are created in the mass, and a final reheating section H. The circuit, which controls the admission of the heating medium to the reheating section H, is left out for clarity, as such circuits are well-known and could be established in different ways as long as they establish a controlled reheating of the mass, preferably around 1–3° C. The admission of heating medium could by such known circuits for example be controlled with a constant temperature of the medium as well as with re-circulation of heating medium through the medium chambers.

By the first embodiment of the apparatus shown in FIG. 2 each cooling section C1 and C2 comprise a separate circuit 9 and 10, respectively for the circulation of cooling medium through the medium chambers.

The cooling circuit 10 of the secondary cooling section C2 comprises a pump Pc, which keeps the cooling medium running continuously through the chambers of that section. A temperature sensor Tv2 measures the water temperature and is connected to a further regulator Rv, which by a connection to a further regulation valve Vr administer the supply of cold water to the circuit 10, so that the temperature of the cooling medium supplied to the chambers of the secondary section C2 is kept essentially constant.

The cooling circuit 9 of the primary cooling section C1 comprises a pump Pr with variable flow, which is controlled in a well-known manner by an electronic regulator Rc, which receives values for the temperature of the mass measured by means of a temperature sensor Tc. By regulating the flow of the pump Pr in response to the mass temperature, the cooling amount is lowered when the mass temperature lowers and vise versa.

The circuit 9 of the primary cooling section C1 furthermore comprises a temperature sensor Tv1, which measures the temperature of the cooling medium supplied to the primary cooling section C1. The temperature sensor Tv1 is connected to an electronic regulator Rv of a well-known type, which by a connection to the regulation valve Vr, administers the supply of cold water, so that the temperature of the cooling medium supplied to the chambers is kept essentially constant in this section as well. One-way valves V determines the flow direction at several positions of the circuits 9 and 10.

The apparatus shown in FIG. 2 comprises a further electronic regulation device or computer Rt, which are connected to the regulators Rv of the cooling circuits 9 and of the primary and of the secondary cooling sections C1 and C2, respectively. The computer Rt receives continuously values for the inlet temperature of the cooling medium supplied to the secondary section C2. The computer is programmed to continuously control, that the temperature of cooling medium flowing through the primary cooling section C1 is kept higher than the measured temperature of cooling medium flowing through the secondary cooling section C2 for any values of those temperatures, that is for any raise or drop in the secondary cooling medium temperature. The computer simply transmits a signal or a command of rising the water temperature to the regulator of the primary cooling circuit 9 when necessary, that is when ever the measured temperature of the secondary cooling medium approaches.

Creation of crystals in the mass during the primary section is thereby avoided, and uncontrolled creation of crystals by the primary section is consequently excluded. The creation of crystals is limited to the secondary section, in which it is controlled accurately to constitute a constant portion of the total amount of tempered mass.

Figure 3:
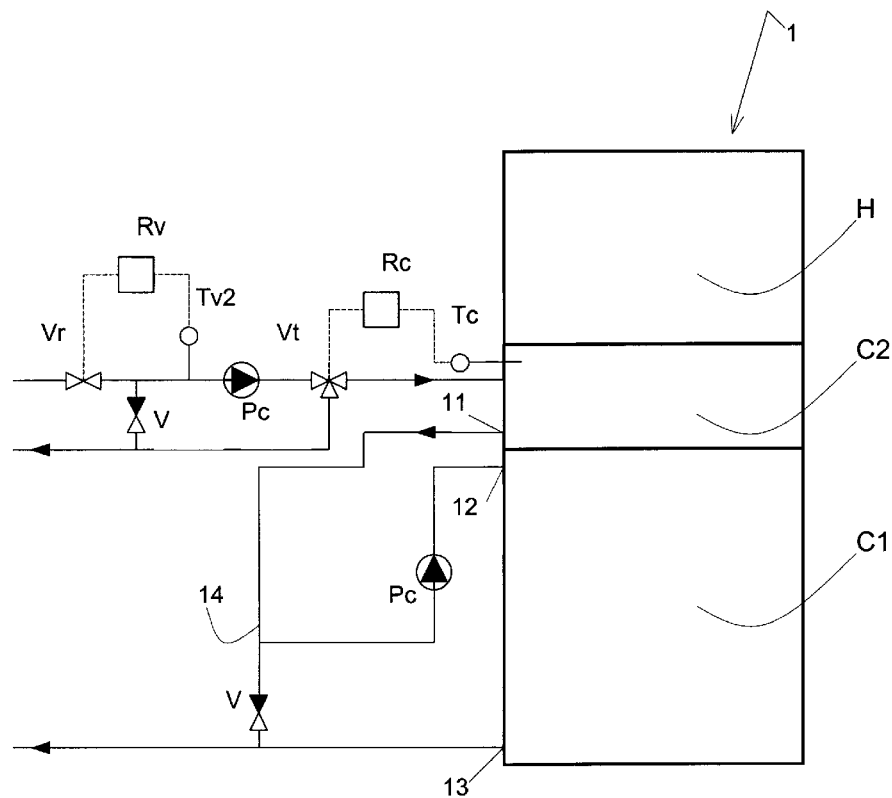
FIG. 3 shows schematically the tempering column and the associated circuit of a second embodiment of a tempering apparatus.
Figure 4:
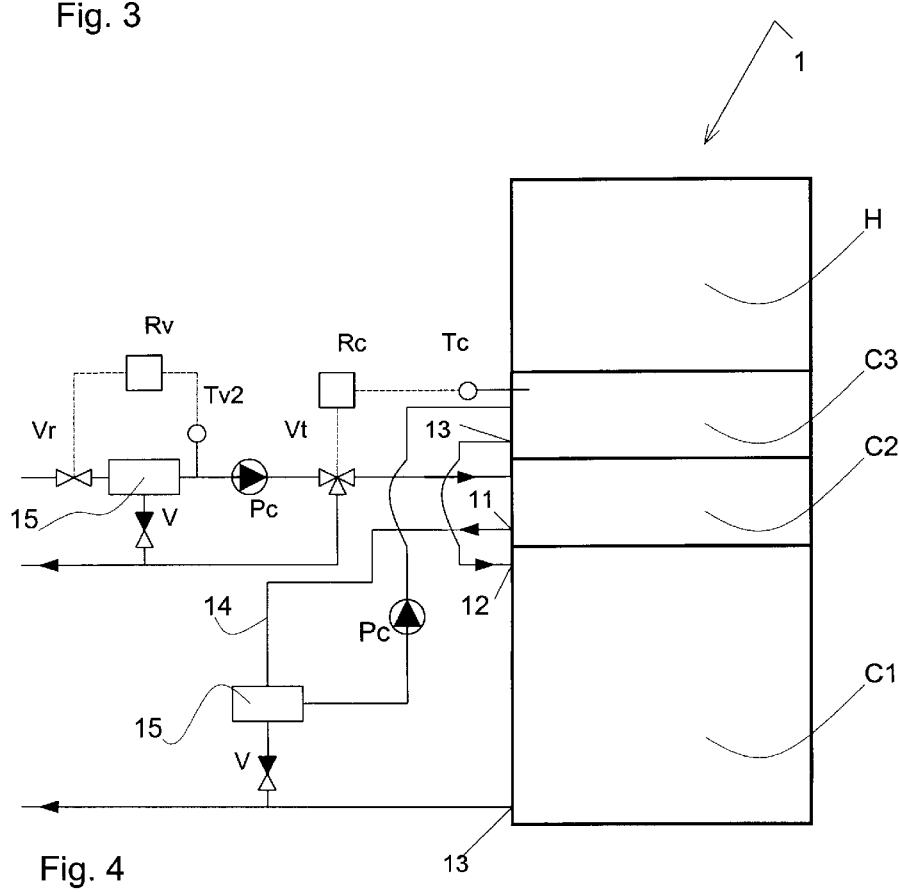
FIG. 4 shows schematically the tempering column and the associated circuit of a third embodiment of a tempering apparatus.

A second and a third embodiment of the inventive apparatus is shown in FIG. 3 and 4, respectively, in the same manner as the first embodiment shown in FIG. 2, and which has incorporated the tempering column 1 of FIG. 1 as well.

By the second embodiment of the inventive apparatus disclosed in FIG. 3 a temperature sensor Tv2 measures the temperature of the cooling medium supplied to a circulation pump Pc. The sensor Tv2 is connected to a regulator Rv, which controls the amount of water administered by the valve Vr, so that the temperature of the cooling medium delivered to the pump Pc is kept constant. A mass temperature sensor Tc is further arranged in the mass, preferably at the end of the final cooling section, and is connected to an electronic regulator Rc adapted to control the flow of the cooling medium through the secondary cooling section C2 in response to the temperature of the mass.

For obtaining this, the regulator Rc is connected to a flow regulation means, such as the depicted three-way valve Vt or other known devices for obtaining such flow control. By this control the amount of cooling medium delivered to the secondary section is always adapted to the instantaneous requirement what ever the temperature or the flow of the mass may be. It is well recognised, that the amount of stable crystals created in the mass in the secondary section is always kept at a constant portion by this means of control.

As shown in FIG. 3 an outlet 11 of the secondary cooling section C2 is connected to an inlet 12 of the primary cooling section C1 by means of a conduit 14. The consequence is, that the temperature of the cooling medium flowing through the primary section is equal to, or higher than any temperature of cooling medium flowing through the secondary section. Hereby is surprisingly achieved, that substantially no crystals will be performed in the primary section and the amount of stable crystals created in the mass could be controlled to a constant and a desirable portion in the secondary section. An "overtempered" mass could thereby be avoided as well.

Considerable savings in the required amounts of cooling water supplied to the process in total, is furthermore achieved by reusing the cooling water leaving the secondary section for the cooling of the primary section as well.

A possible misoperation or a misadjustment of the primary cooling section caused by the personnel is furthermore totally excluded, as no adjustment of the primary section is required at all.

During initial adjustment of the tempering process to the chocolate-like mass in question, the temperature of the cooling medium delivered to the secondary section C2 is lowered until crystals performs in the mass. It was surprisingly found, that when approaching the temperature for creation of crystals, it was sufficient to lower the temperature of the cooling medium administered to the secondary cooling section C2 only tenths of one degree Celsius further for the crystals to perform very suddenly and in a satisfactory amount to reach a "well-tempered" mass. Especially seemed a lowering of 0.5–1.0 degrees Celsius to be sufficient for all types of chocolate-like mass tested.

By the embodiment shown in FIG. 3 the temperature of the cooling medium supplied to the primary cooling section C1 corresponds at least to the temperature of the medium when it leaves the secondary cooling section at the outlet 11. If the temperature rise of the cooling medium through the secondary section is approximately 2.5° C., the temperature of the cooling medium supplied to the primary section C1 will at least be 2.5° C. higher than the temperature of the medium when supplied to the secondary cooling section C2.

The temperature of the cooling medium supplied to the primary section C1 could be even higher, for example when the cooling medium supplied to the primary section C1 is re-circulated through the primary section C1 by means of the pump Pc. The outlet 13 is connected with the inlet 12 as depicted in FIG. 3. Thereby the temperature of the secondary cooling medium could be raised further 0.5–5.0° C. at the inlet 12 in comparison to the temperature at the outlet 11. For a typical size tempering apparatus with a capacity of 1100 kilos tempered mass per hour, the flow of the cooling medium through the secondary cooling section C2 was typically regulated to between 200 and 600 liters per hour, and the re-circulating flow of cooling medium through the primary section could typically be around 3000 liters per hour.

The apparatus disclosed in FIG. 4 corresponds to that of FIG. 3 with the addition of a further subsequent, third cooling section C3, through which the cooling medium, which has left the outlet 11, is lead via the inlet 13 before the medium enters the primary cooling section C1 via the inlet 12. Surprisingly, a more "stable" heat exchanger is achieved, than without that third section C3. Hereby is meant, that the measured cooling medium temperatures could be kept more stable than without that third section. This applies especially when the mass temperature sensor Tc is arranged in one of the mass chambers of the third section C3.

By the inventive apparatus medium vessels 15 could be arranged at one or more of the circuits. Such vessels could comprise heating means, which are not disclosed. The vessels could furthermore be arranged as heat exchangers.

Figure 5:
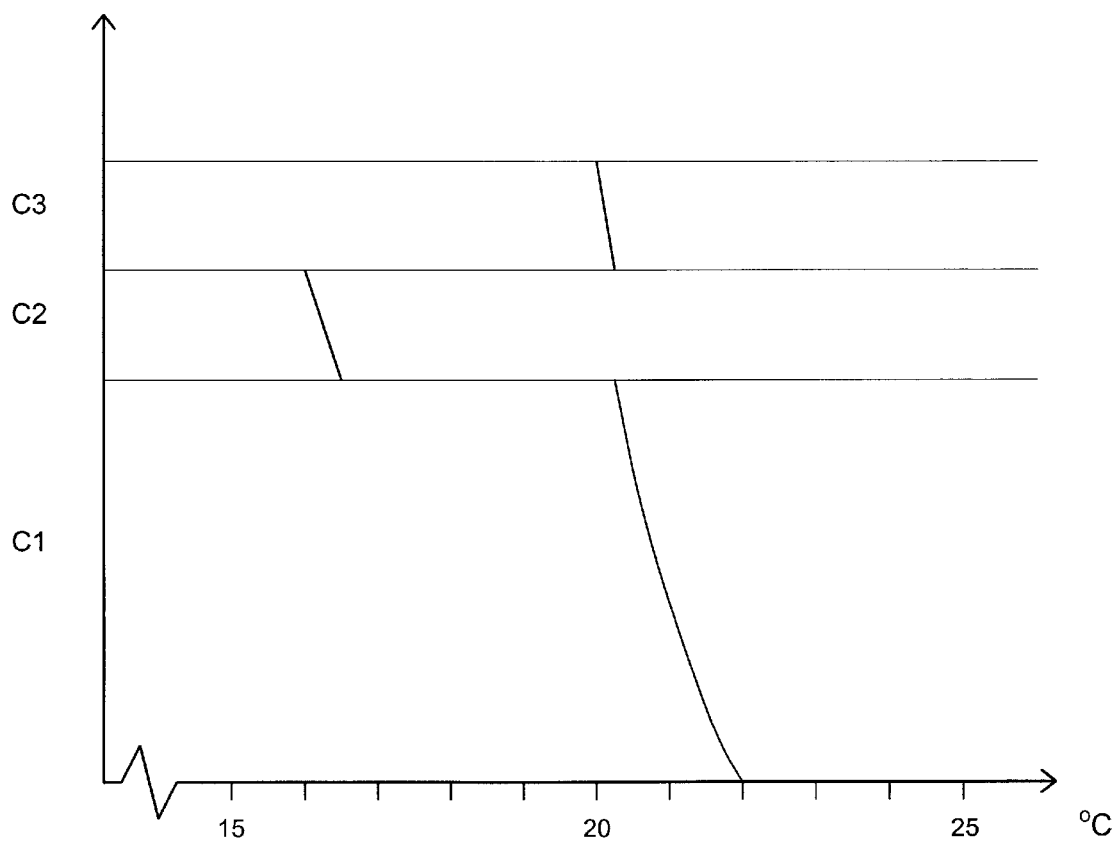
FIG. 5 shows temperature curves for the cooling medium flowing through a tempering apparatus according to the third embodiment shown in FIG. 4.

Typical temperatures of the cooling medium flowing through the apparatus shown in FIG. 4 are depicted by the temperature curves of FIG. 5. The curves apply for tempering of around 1100 kilos dark chocolate per hour having a temperature of 48° C. when supplied to the tempering apparatus, and a temperature of around 29° C. at the end of the third cooling section. In the reheating section, the mass was warmed to around 31° C.

By a row of tests several known types of apparatuses was compared to the inventive embodiment shown in FIG. 4 of this application.

By these tests, liquid dark chocolate of a well-known type was warmed to a constant temperature of 48° C. when supplied to the apparatus in question. The supply of the mass was changed between 970 kilos per hour and 550 kilos per hour. During the whole test period, the temperatures of the cooling water entering or leaving the respective cooling section was measured continuously. Furthermore, tempering curves and DSC measurements disclosing the achieved tempering state of the mass was evaluated.

Astonishingly, it was discovered, that by one of such known apparatus described in EP 0 472 886 A1, the temperatures of the primary cooling section fluctuated within an interval of 8° C. and a constant portion of crystals in the tempered mass could not be reached. This was caused by an unavoidable, periodically "overtempering". In contradiction, the temperatures of the primary cooling section fluctuated within an interval of 2° C. only by the inventive apparatus shown in FIG. 4. An essentially constant portion of crystals within few percents was surprisingly observed by the inventive apparatus.

What is claimed is:

1. Apparatus for continuous tempering of a fat-containing, chocolate mass, comprising a primary cooling section, a subsequent secondary cooling section in which crystals are created in the mass, and a final reheating section, and means for controlling the temperature of cooling medium flowing through the primary cooling section so that the temperature of said cooling medium is higher than the temperature of cooling medium flowing through the secondary cooling section for any raise or drop in the secondary cooling medium temperature.

2. Apparatus according to claim 1, which means are adapted to measure the temperature of the secondary cooling medium performing the cooling in the secondary cooling section.

3. Apparatus according to claim 1, wherein an outlet of the secondary cooling section for the secondary cooling medium is connected to an inlet of the primary cooling section for the primary cooling medium by a conduit.

4. Apparatus according to claim 3, wherein an outlet of the primary cooling section for the primary cooling medium is connected to the inlet of the primary cooling section for recirculating cooling medium through the primary cooling section.

5. Apparatus according to claim 3 further comprising a subsequent, third cooling section through which the conduit leads the cooling medium before it enters the inlet of the primary cooling section.

6. Apparatus according to claim 1, further comprising a mass temperature sensor arranged in the mass and connected to a further control means for controlling the flow of the cooling medium flowing through the secondary cooling section in response to the temperature of the mass.

7. Apparatus according to claim 6 whereby the further control means comprises an electronic control unit connected to the mass temperature sensor as well as to means for regulating the flow of the cooling medium supplied to the secondary cooling section.

8. Apparatus according to claim 1, further comprising a cooling medium temperature sensor arranged in a cooling medium supply before it enters the secondary cooling section, and connected to other control means, that keep the temperature of the cooling medium at a constant level.

9. Apparatus according to claim 8, whereby the other control means comprises an other electronic control unit as well as means for regulating the flow of the cooling medium.

10. Apparatus according to claim 1, comprising pump means providing a continuous flow of cooling medium through the second cooling section.

11. Apparatus according to claim 1, whereby the primary and secondary cooling sections and the reheating section are arranged on top of each other in a column, each of which cooling sections comprises at least one mass chamber through which the mass flows, as well as at least one medium chamber through which the cooling medium flows.

12. Apparatus according to claim 11 whereby the mass is subjected to stirring by stirring means arranged in the mass chambers.

* * * * *